US006675508B2

(12) United States Patent
Tamaru et al.

(10) Patent No.: US 6,675,508 B2
(45) Date of Patent: Jan. 13, 2004

(54) HYDRAULIC SHOVEL

(75) Inventors: Masatake Tamaru, Tatsunokuchi-machi (JP); Masami Naruse, Hirakata (JP); Kenzo Kimoto, Hirakata (JP)

(73) Assignee: Komatsu Ltd. (JP)

( * ) Notice: Subject to any disclaimer, the term of this patent is extended or adjusted under 35 U.S.C. 154(b) by 0 days.

(21) Appl. No.: 10/131,149

(22) Filed: Apr. 25, 2002

(65) Prior Publication Data

US 2002/0157284 A1 Oct. 31, 2002

(30) Foreign Application Priority Data

Apr. 26, 2001 (JP) ....................................... 2001-129335

(51) Int. Cl.[7] ............................ E02F 5/02; B60K 26/00

(52) U.S. Cl. .......................................... 37/348; 180/333

(58) Field of Search .......................... 37/347, 348, 382, 37/383; 172/2–11; 705/50; 414/694, 699, 379; 180/6.32, 333, 336; 74/471 XY, 385, 471 R

(56) References Cited

U.S. PATENT DOCUMENTS 3,350,956 A * 11/1967 Mongue ................... 74/471 R
4,738,417 A * 4/1988 Wenger ....................... 244/234
4,819,896 A * 4/1989 Narad ......................... 244/234
5,142,931 A * 9/1992 Menahem .............. 74/471 XY
5,307,631 A * 5/1994 Tatsumi et al. ............... 60/452
5,497,847 A * 3/1996 Ota et al. ................... 180/333
5,704,429 A * 1/1998 Lee et al. .................... 172/4.5

FOREIGN PATENT DOCUMENTS

JP 06-108495 4/1994

* cited by examiner

*Primary Examiner*—Robert E. Pezzuto
(74) *Attorney, Agent, or Firm*—Rader, Fishman & Grauer PLLC

(57) ABSTRACT

A hydraulic shovel is provided which comprises a pair of left and right running/rotation pedals (3L and 3R) for running or rotating a vehicle, and a single running/rotation lever 7 which is installed separately from the pedals for similarly running or rotating the vehicle. The shovel allows the operator to run or rotate the vehicle by operating on the running/rotation pedals 3L and 3R, as well as by manipulating the running/rotation lever 7. Moreover, because the running/rotation lever 7 consists of a single lever, the operator can easily manipulate it by one hand, being relieved of complicated operations and inconveniencies encountered with the conventional machine, which ensures the improved operability.

18 Claims, 6 Drawing Sheets

FIG.6A

| IF | DECISION OF INPUT SIGNAL BY CONTROLLER |
|---|---|
| $S_K \neq 0$ | $P_L = P_L * 0 = 0$ , $P_R = P_R * 0 = 0$ |
| $S_K = 0$ | $P_L = P_L$ , $P_R = P_R$ |

FIG.6B

| IF | DECISION OF INPUT SIGNAL BY CONTROLLER | |
|---|---|---|
| | STEP 1 | STEP 2 |
| $S_K \neq 0$ | $S_D = S_D$ , $S_S = S_S$ | $S_{\bar{O}} = S_{\bar{O}} * 0 = 0$ |
| | | $S_G = S_G * 0 = 0$ |
| | $S_{\bar{O}} = S_{\bar{O}}$ | $S_D = S_D * 0 = 0$ , $S_S = S_S * 0 = 0$ |
| | | $S_G = S_G$ |
| | $S_G = S_G * 0 = 0$ | $S_{\bar{O}} = S_{\bar{O}} * 0 = 0$ |
| | | $S_S = S_S * 0 = 0$ |

HYDRAULIC SHOVEL

BACKGROUND OF THE INVENTION

1. Field of the Invention

The present invention relates to a hydraulic shovel, particularly to an improvement with regard to pedals for running or rotating a vehicle and to a lever for running or rotating the vehicle.

2. Description of Related Art

Conventionally, within a cab (operator's platform) of a vehicle for operating a hydraulic shovel there are provided a pair of projecting levers for running/rotating the vehicle on a floor portion of the cab in front of and apart from a seat. The operator who sits on the seat activates a left hydraulic motor of an underlying running system via a left running/rotation lever, while he activates a right hydraulic motor via a right running/rotation lever.

There are also provided a pair of running/rotation pedals integrally united below the running/rotation levers, i.e., at a position close to the floor. The operator can achieve the same function as obtained via the left running/rotation lever, by operating on a left running/rotation pedal, an the same function as obtained via the right running/rotation lever, by operating on a right running/rotation pedal.

According to certain types of hydraulic shovels, however, the running/rotation levers and the running/rotation pedals are separated from each other because otherwise the running/rotation levers would interfere with the sight of the operator. In some of them, a pair of running/rotation levers are gathered compactly on one side of the seat.

However, if the running/rotation levers are separated from the running/rotation pedals, and gathered compactly on one side of the seat, it is necessary for the operator to manipulate the two running/rotation levers with one hand which may complicate the operation.

To meet this problem, if the pair of running/rotation levers are installed one on each side of the seat, they will require for their manipulation both hands of the operator, which may pose a problem in certain situations.

SUMMARY OF THE INVENTION

A main object of this invention is to improve the operability of a hydraulic shovel.

This invention is characterized by comprising running/rotation pedals by which to run/rotate a vehicle, a single lever which is installed separately from the running/rotation pedals and which is similarly used for running/rotating the vehicle, and a control means which permits either the running/rotation pedals or the running/rotation lever to be available for operation at a given moment.

According to this invention configured as above, the operator can move a hydraulic shovel in a desired direction or rotate it on the same spot by operating on the running/rotation pedals with his feet, or can perform as well the same operation by manipulating the running/rotation lever with his hand. Because the running/rotation lever consists of a single lever, the operator can easily manipulate the lever with his single hand, being relieved of the complications and inconveniences encountered with the conventional hydraulic shovel. This improves the operability of the hydraulic shovel.

This invention is characterized by comprising a pair of left and right running/rotation pedals which output a running signal for forward or backward movement when the two pedals are concurrently depressed forward or backward, or a turn signal for leftward or rightward turn as the case may be when one of the two pedals is depressed forward or backward; a single running/rotation lever which outputs a running signal for forward or backward movement when the lever is slanted forward or backward, a steering signal for leftward or rightward turn as the case may be when the lever is rotated while it is kept slanted forward or backward, or a rotation signal for rotating the vehicle standing on a spot when the lever is rotated while it is kept at a neutral position; and a control means which permits either the pair of left and right running/rotation pedals or the single running/rotation lever to operate at a given moment.

According to this invention, as disclosed in the foregoing paragraph, it is possible to run or rotate the vehicle of a hydraulic shovel by operating by feet the pair of left and right running/rotation pedals, as well as by operating by hand the single running/rotation lever, which will serve to relieve the complications encountered with the conventional hydraulic shovel and to improve the operability of the machine.

According to this invention, the running/rotation lever is desirably installed close to one side of the operator's seat.

According to the above configuration, the operator sitting on the seat can easily manipulate the running/rotation lever which will further contribute to the improvement of the operability.

According to this invention, there are desirably provided consoles on both sides of the seat one of which carries the running/rotation lever thereupon.

According to the above configuration, if the consoles are placed to have an appropriate height, they also serve as an armrest for the operator, which will allow the operator to operate the machine while taking a relaxed posture.

According to this invention, the operation controlling means desirably gives priority to the running/rotation lever in preference to the running/rotation pedals when running/rotating the vehicle is required.

According to this configuration, even when the running/rotation lever and the running/rotation pedals are manipulated concurrently, the operation via the running/rotation lever will be adopted in preference to the operation via the running/rotation pedals which will prevent the occurrence of wrong operations. In addition, while the operator operates on implement operation levers which of course must be attached to the left and right sides of the operator for allowing him to operate a hydraulic shovel, i.e., while the operator is working with an implement, he can run the vehicle by operating on the running/rotation pedals.

According to this invention, desirably, the running/rotation lever is provided with a signal output means which outputs a signal to the operation controlling means when the vehicle is run or rotated, and the operation controlling means controls such that the operator is allowed to run or rotate the vehicle by operating on the running/rotation pedals as long as there is no signal outputted by said signal output means.

According to this configuration, because the operation controlling means is provided with a signal from the running/rotation lever, and thus quickly and securely grasps the current operation state of the running/rotation lever, it can instantly determine whether the operation via the running/rotation pedals should be feasible or not.

According to this invention, the signal output means is desirably a grip detection sensor which monitors how the running/rotation lever is gripped and outputs a signal based on the monitoring result.

According to the above configuration, a signal is outputted as soon as the running/rotation lever is gripped, even if the running/rotation lever is not manipulated for a certain operation. Accordingly, even if the running/rotation pedals are manipulated, the request transmitted via the manipulation of the running/rotation pedals is rejected, as long as the running/rotation lever is held by the operator. Thus, for example, when the operator is engaged with a work which absolutely requires stoppage of the vehicle, the operator will be safely guarded against the risk of running the vehicle by wrongly operating on the running/rotation pedals by accident, as long as he uses the running/rotation lever for that work.

The running/rotation lever of this invention comprises a lever body which can be slanted, and a rotational knob attached to the lever body. When the lever body is slanted forward or backward, a running signal is outputted so as to cause the vehicle to run forward or backward; when the rotational knob is rotated while the lever body is being slanted forward or backward, a turn signal is outputted so as to cause the running vehicle to turn left or right; or when the rotational knob is rotated while the lever body is kept at a neutral position, a rotation signal is outputted so as to cause the vehicle to rotate on the spot.

According to the above configuration, because the operator can steer the vehicle or rotate the vehicle on the spot by simply operating on the rotational knob, it is possible to securely steer or rotate the vehicle by simply resorting to the single running/rotational lever.

According to the invention, the lever body of the running/rotation lever is desirably configured such that, if the lever body is slanted leftward or rightward, an adjustment signal is outputted so as to cause the distance between left and right tracks of the running system to be altered.

When operation effective for adjusting the inter-track distance is introduced, the distance between left and right tracks of the underlying running system is adjusted, and this operation requires only the running/rotation lever to be slanted in two opposite directions, i.e., leftward or rightward. In accordance with this, the single running/rotation lever will allow the operator to run or rotate the vehicle as well as to adjust the inter-track distance, if the system is configured, for example, such that slanting the lever body forward or backward will cause the vehicle to run forward or backward, while slanting the lever body in other directions will cause the inter-track distance to be altered.

According to this invention, guide grooves are desirably provided to constrain the slanting direction of the running/rotation lever.

According to the above configuration, because the slanting direction of the running/rotation lever is constrained by the guide groove, the risk of wrongly introducing the running/rotation operation instead of the adjustment of the inter-track distance or vice versa will be safely avoided.

According to this invention, the running/rotation lever is desirably provided with a control means that controls the operation involved in the adjustment of the inter-track distance.

According to the above configuration, simple slanting of the running/rotation lever will not lead to the adjustment of the inter-track distance as long as the control imposed by the control means is not released, and the risk of wrongly adjusting the inter-track distance by accident while the vehicle is running will be safely avoided.

BRIEF DESCRIPTION OF THE DRAWINGS

FIGS. 6A and 6B are charts to illustrate how the operation controlling means of the foregoing embodiment determines the contents of various incoming signals.

DETAILED DESCRIPTION OF THE PREFERRED EMBODIMENT(S)

A preferred embodiment of this invention will be described below with reference to the accompanying drawings.

Figure 1:
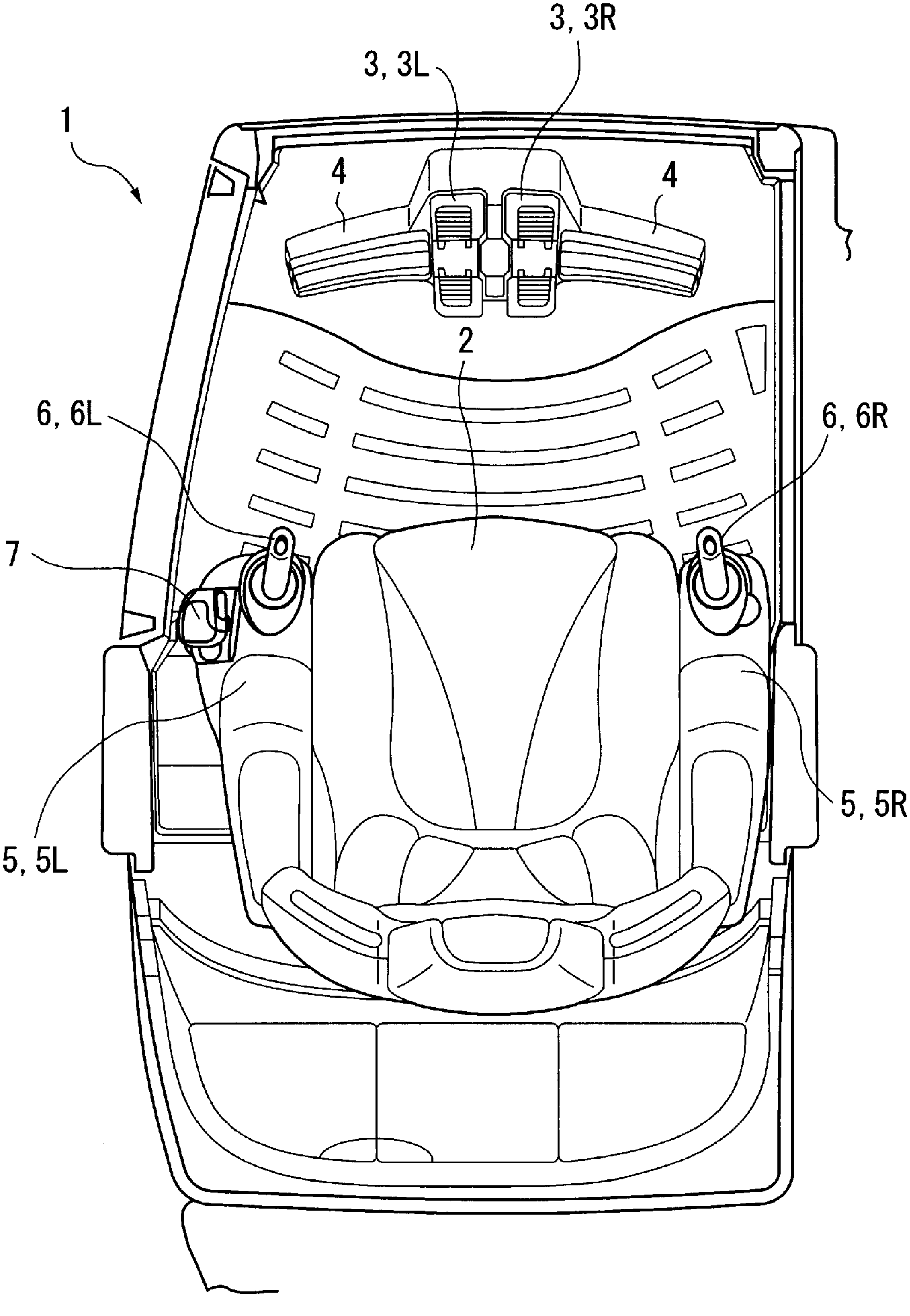
FIG. 1 gives a flat view of a cab (operator's platform) of a vehicle for a hydraulic shovel representing a first embodiment of this invention.
Figure 2:
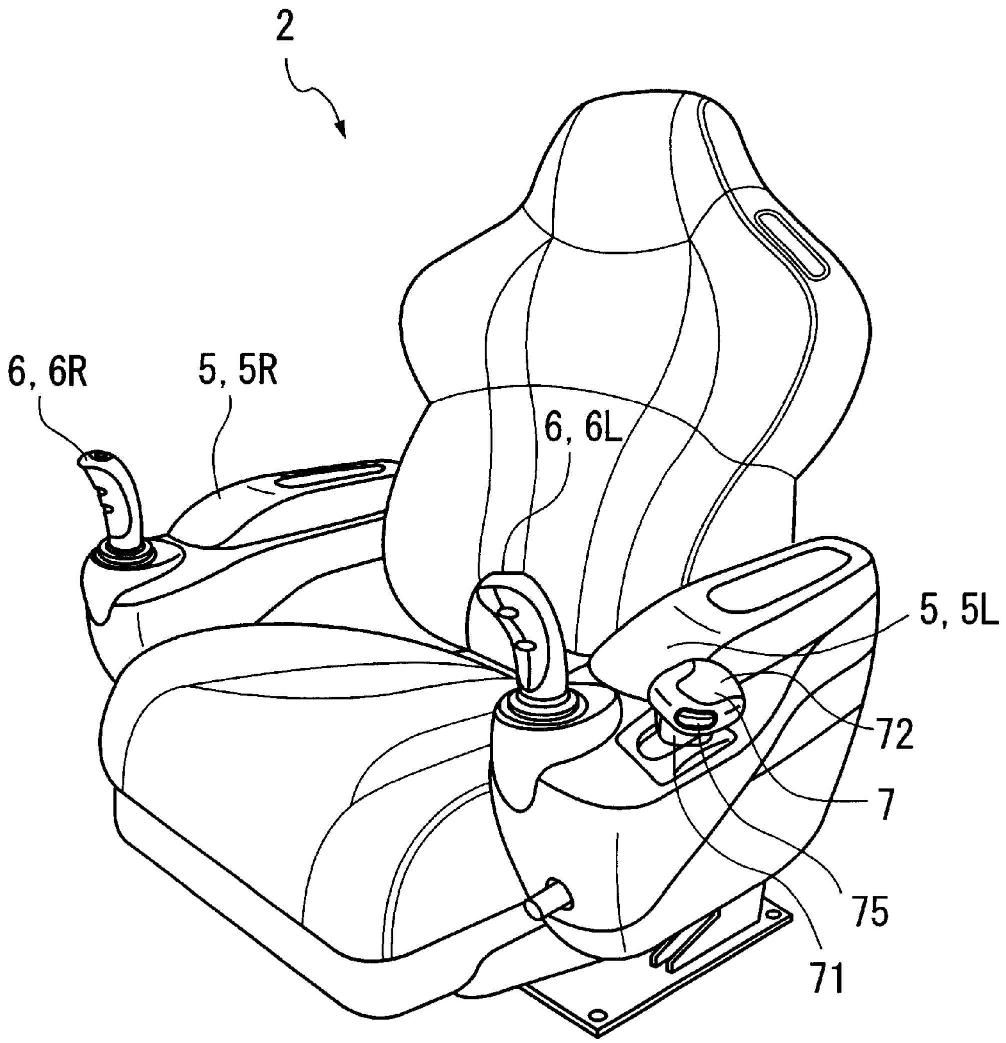
FIG. 2 gives a perspective view of a seat fixed in the cab of the foregoing embodiment.
Figure 3:
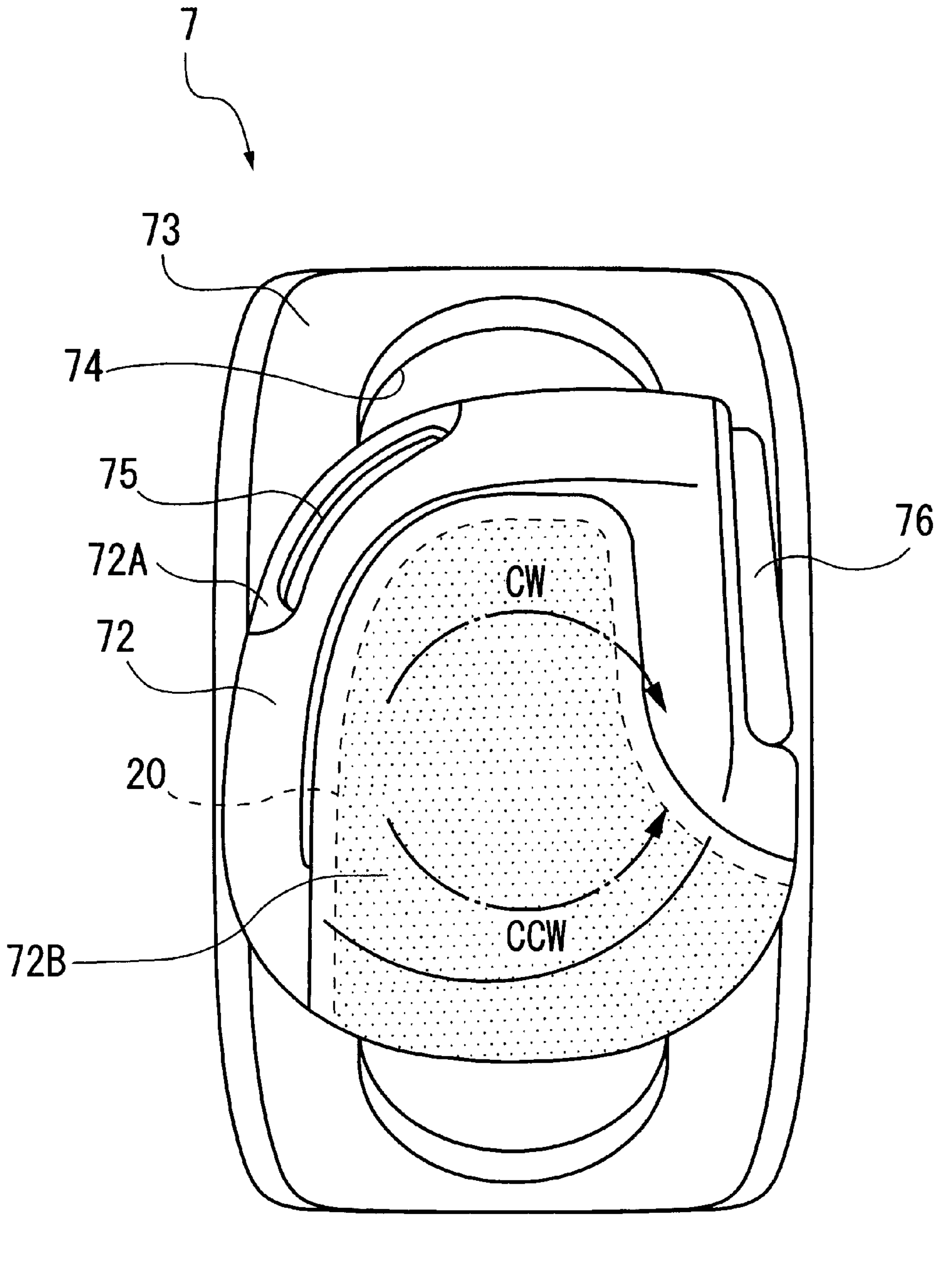
FIG. 3 gives an enlarged flat view of a running/rotation lever installed on the seat of the foregoing embodiment.
Figure 4:
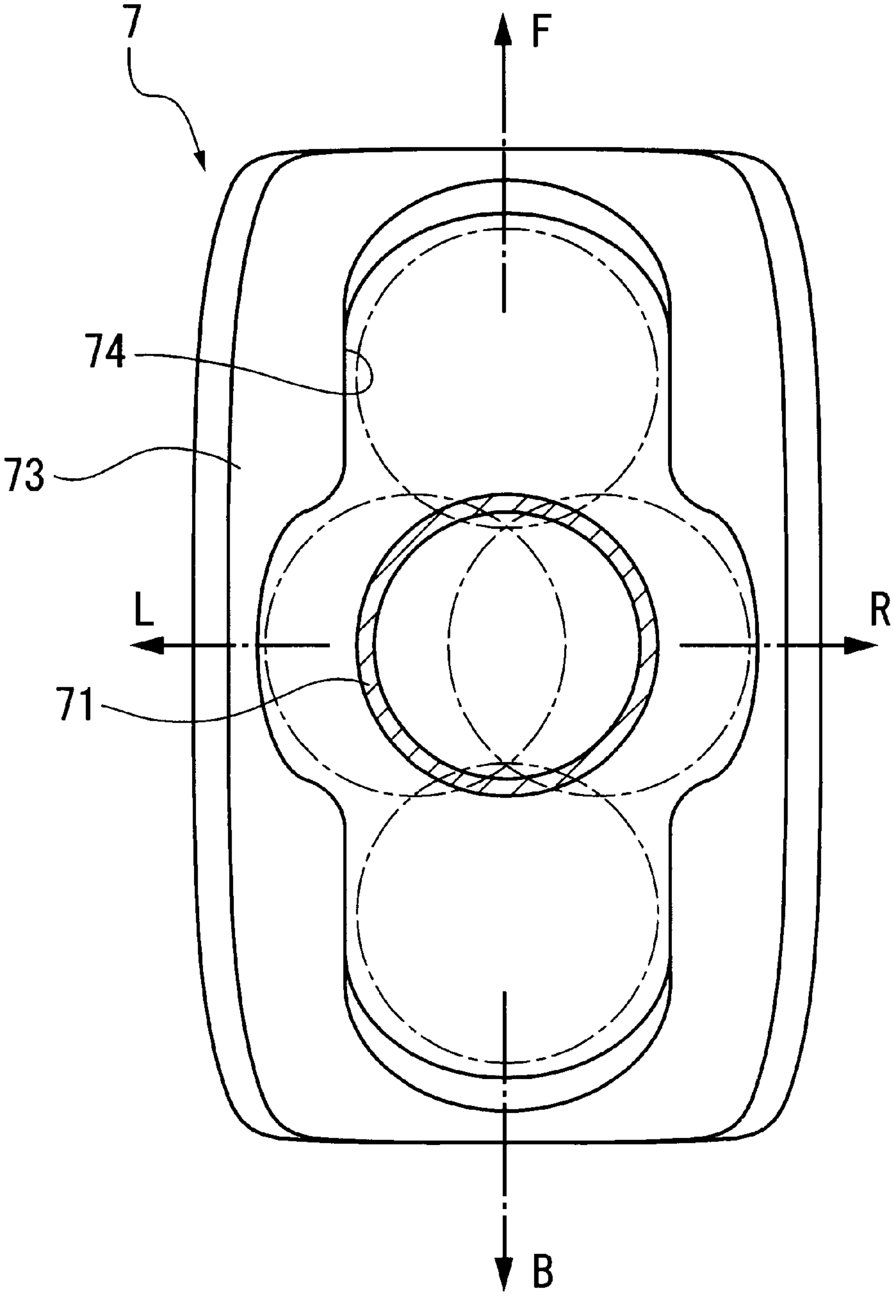
FIG. 4 gives a flat view of the running/rotation lever of the foregoing embodiment partly cut away for illustration.

FIG. 1 gives a flat view of a cab (operator's platform) 1 of a vehicle for a hydraulic shovel; FIG. 2 a perspective view of an operator's seat 2 fixed in the cab 1; FIG. 3 an enlarged flat view of a running/rotation lever 7 installed on the operator's seat 2; FIG. 4 a flat view of the running/rotation lever 7 being partly cut away for illustration; and FIG. 5 a diagram of a circuit necessary for controlling the hydraulic shovel.

As shown in FIG. 1, within the cab 1 of the vehicle for a hydraulic shovel representing a first embodiment of this invention, there are provided a pair of running/rotation pedals 3 (3L and 3R) on a floor section in front of the seat 2 ("in front of" means a forward direction from the viewpoint of an operator sitting on the seat, and later expressions regarding the direction will be introduced in terms of the operator's viewpoint sitting on the seat). The running/rotation pedals 3, by being depressed forward or backward by feet, allow the operator to freely run or rotate the vehicle. The outputs and rotations of left and right running hydraulic motors 9 (FIG. 5) attached to an underlying running system vary depending on the depressed amounts and directions of the pedals 3. Footrests 4 are provided on both lateral margins of the running/rotation pedals 3 and both footrests 4 are integrally molded with a synthetic resin, which an improved design quality.

As shown in FIGS. 1 and 2, on both sides of the seat 2, there are provided a variety of switches and indicators not illustrated here as well as consoles 5 (5L and 5R) which also serve as arm rests for the operator. On the front part of each console 5, projects an implement operation lever 6 (6L and 6R) of a gun grip type. An implement operation lever 6L or a lever on the left side from the viewpoint of the operator sitting on the seat is used for operating an arm or a component necessary for the floor attachment of an implement, and for rotating an upper rotational body carrying the cab 1 and the implement. The right implement operation lever 6R is used for operating a boom or a bucket which is also required for the floor attachment.

Farther left from the implement operation lever 6L beside the left console 5L there is provided a running/rotation lever 7 at a position which permits the operator to easily manipulate the lever by his left hand. As shown in FIGS. 2 to 4, the running/rotation lever 7 comprises a cylindrical lever body 71, and a rotational knob 72 rotatably attached to the top of the lever body 71. The lever body 71 is slanted while the rotational knob 72 is held by hand.

As shown in FIG. 4, the lever body 71 can be slanted along guide grooves 74 approximately shaped like a cross from a flat view which are formed on a guide cover 73. When the lever body 71 is slanted from a central neutral position at the intersection of the guide grooves 74 forward (as indicated by arrow F), the vehicle runs forward. When the same lever is slanted towards the operator (as indicated by arrow B), the vehicle runs backward (retreats).

It is also possible to increase a distance between left and right tracks (this inter-track distance will be called hereinafter as "gauge width") of the underlying running system, by slanting the lever body 71 leftward (as indicated by arrow L) from the neutral position, as well as to reduce the distance by slanting the lever body 71 rightward (as indicated by arrow R). This operation concerns with the increase/reduction of the gauge width: the operation consists of slanting the lever body in an appropriate direction while depressing a gauge width adjustment button 75 provided on a depression 72A formed on the front left end of the rotational knob 72 (FIG. 3), the button serving as a control means. Because slanting of the lever body 71 in antero-posterior directions does not occur concurrently with slanting of the same lever in lateral directions on account of the restrictions imposed by the guide grooves 74, the operator can not alter the gauge width while he is running the vehicle, whereas he can not run the vehicle while he is altering the gauge width.

As shown in FIG. 3, the rotational knob 72 is sufficiently large as to permit the operator to grip it from above with the palm of his hand, and shaped like a computer-mouse. When the lever body 71 is slanted forward or backward, it is possible to turn the vehicle towards right by rotating the rotational knob 72 clockwise (as indicated by arrow CW), or to turn the vehicle towards left by rotating the rotational knob counterclockwise (as indicated by arrow CCW). Also, when the lever body 71 is at the neutral position, it is possible to rotate the vehicle on the same spot by rotating the rotational knob 72.

The rotational knob 72 incorporates a pressure sensitive sensor 20 which serves as a grip detection sensor to output a signal when the knob is gripped, and the top surface of the rotational knob 72 serves as a pressure sensitive surface 72B. As long as the operator's hand rests on the running/rotation lever 7 during operation, the sensor senses the operator's hand resting on the pressure sensitive surface 72B of the rotational knob 72.

In addition to the gauge width adjustment button 75, the rotational knob 72 of this embodiment incorporates a switching button 76 which switches the idling mode of engines from high to low and vice versa.

As described above, according to the hydraulic shovel of this embodiment, the running/rotation pedals 3 and the running/rotation lever 7 are introduced for running or rotating the vehicle, and it is possible to alter the gauge width by resorting to the running/rotation lever 7.

Control of the running/rotation pedals 3 and the running/rotation lever 7 will be described below with reference to FIGS. 5 and 6.

Figure 5:
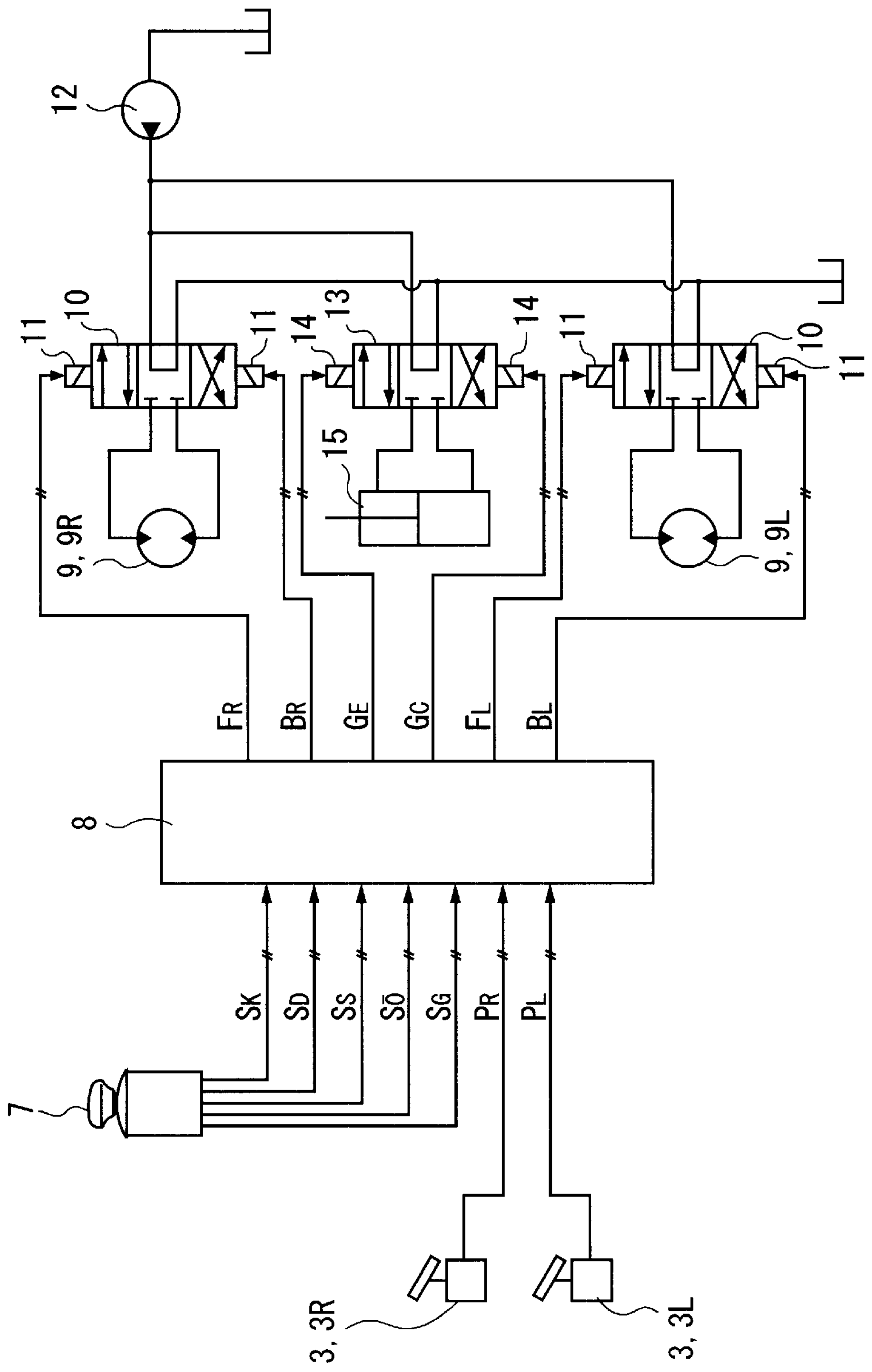
FIG. 5 is a diagram to show a control circuit for controlling a hydraulic shovel of the foregoing embodiment.

With reference to FIG. 5, the running/rotation pedals 3L and 3R, being activated by the operator, output running signals $P_L$ and $P_R$ to an IC-based controller 8 which serves as a control means. The running/rotation lever 7, being slanted forward or backward by the operator for running, outputs a running signal $S_D$ to the controller 8 via a potentiometer not illustrated here, and further a turn signal $S_S$, when manipulation of the rotational knob is added to turn the vehicle left or right.

The controller 8 which has received the running signals $P_L$, $P_R$, $S_D$ and $S_S$ outputs activating signals $F_L$, $F_R$, $B_L$ and $B_R$ to solenoids 11 attached to a pair of control valves 10 (10L and 10R), thereby causing hydraulic pressure to be provided to hydraulic running motors 9L and 9R via a hydraulic pump 12 which is driven by an engine. However, FIG. 5 depicts a state where no running/rotation operation is introduced, that is, the control valves 10 with four ports and three positions available are at a position where no hydraulic pressure is applied to the hydraulic motors 9L and 9R.

The running/rotation lever 7, as long as it is manipulated by the operator, senses the grip of the operator via the pressure sensitive sensor 20, and outputs a grip detection signal $S_K$ to the controller 8. It is also activated when the gauge width adjustment button 75 attached to the rotational knob 72 is depressed, and outputs an adjustment button activation signal $S_O$, and, whenever it senses the running/rotation lever 7 (lever body 71) being slanted in lateral directions for the adjustment of the gauge width, it outputs a gauge width adjustment signal $S_G$.

Incidentally, depression of the switching button 76 attached to the rotational knob 72 will lead to the evocation of a switching signal. However, because this signal does not have a notable effect on the control described later, its illustration and description will be omitted here.

When the controller 8 determines that the gauge width adjustment signal $S_G$ is valid, it outputs an expansion signal $G_E$ or a narrowing signal $G_C$ to the solenoids 14 attached to the control valves 13, and causes the hydraulic pump 12 to provide hydraulic pressure to a gauge cylinder 15, thereby permitting the gauge width to be altered. However, FIG. 5 depicts a state where no alteration of the gauge width is introduced, that is, the control valve 13 with four ports and three positions is at a position where no hydraulic pressure is applied to the gauge cylinder 15.

FIG. 6 is a chart to show logic working at the controller 8, that is, to schematically show how the signals $S_K$, $P_L$, $P_R$, $S_D$, $S_S$, $S_O$ and $S_G$ entering the controller 8 will be processed there.

To put it specifically, as shown in FIG. 6(A), if (IF) a grip detection signal $S_K$ is not "0 (zero)," that is, if the running/rotation lever 7 is manipulated by the operator for running/rotation or for adjustment of the gauge width (or the operator's hand is in contact with the pressure sensitive surface 72B), the controller 8 determines, even if the running/rotation pedals 3L and 3R are activated by the operator and running signals $P_L$ and $P_R$ are fed to the controller 8, those running signals $P_L$ and $P_R$ are "zero," and rejects the operation requested via the running/rotation pedals 3L and 3R, by blocking the transmission of signals $F_L$, $F_R$, $B_L$ and $B_R$ necessary for the activation of the control valves 10.

In contrast, if a grip signal $S_K$ is "0," (or actually it corresponds to a state where no grip signal $S_K$ is outputted), and the running/rotation lever 7 is not manipulated (the operator's hand is not in contact with the pressure sensitive surface 72B), running signals $P_L$ and $P_R$ are accepted as they are ("$P_L$=$P_L$, and $P_R$=$P_R$"), operation requested via activation of the running/rotation pedals is permitted, and signals $F_L$, $F_R$, $B_L$ and $B_R$ necessary for activation of the control valves 10 are outputted to activate the hydraulic motors 9L and 9R.

Namely, running/rotation or alteration of the gauge width introduced via the running/rotation lever 7 is given priority over running/rotation introduced via the running/rotation pedals 3L and 3R. As long as the vehicle runs being operated via the running/rotation lever 7, a request for running introduced via the running/rotation pedals 3 is rejected, which prevents the controller 8 or others from permitting wrong operations. A request for running introduced via the running/rotation pedals 3 is also rejected, as long as alteration of the gauge width is in progress, for fear that the vehicle might make an undesired run while the gauge width is being altered.

On the other hand, as long as the running/rotation lever 7 is not manipulated, operation via activation of the running/rotation pedals 3L and 3R is permitted. Thus, as long as the operator is busy operating on the implement operating levers 6L and 6R, and does not hold the running/rotation lever 7, he is permitted to run or rotate the vehicle by operating on the running/rotation pedals 3L and 3R, which makes it possible for him to run or rotate the vehicle, while operating the implement.

As shown in FIG. 6(B), if (IF) the operator holds the running/rotation lever 7 (or a grip detection signal $S_K$ is not "0"), and then slants the lever 71 forward or backward, or rotates the rotational knob 72, thereby generating a running signal $S_D$ or a rotation signal $S_S$, the controller 8 accepts the running signal $S_D$ or the rotation signal $S_S$ as it is, and permits the operator to run or rotate the vehicle via activation of the running/rotation lever 7 (the lever body 71 and the rotational lever 72), which leads to the output of signals $F_L$, $F_R$, $B_L$ and $B_R$ to the control valves 10 to activate the hydraulic motors 9L and 9R.

However, if the operator depresses the gauge width adjustment button 75 while he runs the vehicle, the controller 8 regards an adjustment button activation signal $S_O$ evoked thereby to be "0," thereby prohibiting the gauge width from being altered during running of the vehicle, and blocking the output of track expansion signals $G_E$ and $G_C$ to the control valves 13. Not to mention, if the operator runs the vehicle by slanting the running/rotation lever 7 forward or backward, the lever is prohibited from slanting leftward or rightward on account of the physical restrictions imposed by the guide grooves 74 as discussed above, and entry of a gauge width adjustment signal $S_G$ to the controller is also strictly prohibited. Therefore, alteration of the gauge width during running of the vehicle is prohibited in this operation mode, too. Moreover, according to this embodiment, a gauge width adjustment signal $S_G$ fed to the controller 8 is determined to be "0," if the rotational knob 72 is firstly rotated and then the running/rotation lever 7 is slanted leftward or rightward.

In addition, in a state as depicted in FIG. 6(B), if (IF) the operator holds the running/rotation lever 7 (a grip detection signal $S_K$ is not "0") and depresses the gauge width adjustment button 75 thereby causing an adjustment button activation signal $S_0$ to enter the controller 8, the controller 8 accepts the adjustment button activation signal $S_O$ as it is or "$S_O$=$S_O$."

At a subsequent stage, if the operator runs or rotates the vehicle by manipulating the running/rotation lever 7, thereby causing a running signal $S_D$ or a rotation signal $S_S$ to enter the controller 8, the controller 8 determines the running signal $S_D$ or the rotation signal $S_S$ to be "0," that is, the controller 8 prohibits the operator from running or rotating the vehicle while he is depressing the gauge width adjustment button 75.

In contrast, if the operator slants the running/rotation lever 7 leftward or rightward while "$S_O$=$S_O$," thereby causing a gauge width adjustment signal $S_G$ to enter the controller 8, the controller 8 accepts the gauge width adjustment signal $S_G$ as it is, or determines it to be "$S_G$=$S_G$," and outputs an expansion signal $G_E$ or a contraction signal $G_C$ to the control valves 13, thereby causing a gauge cylinder 15 to alter the gauge width.

Alternatively, in the state as depicted in FIG. 6(B), if (IF) the operator holds the running/rotation lever 7 (a grip detection signal $S_K$ is not "0") and then slants the running/rotation lever 7 leftward or rightward, thereby causing a gauge width adjustment signal $S_G$ to enter the controller 8, the controller 8 determines the gauge width adjustment signal $S_G$ to be "0," and prohibits the output of an expansion signal $G_E$ or a contraction signal $G_C$ to the control valves 13. This is because the system is configured such that alteration of the gauge width is feasible only when the gauge width adjustment button 75 is concurrently depressed, or in other words, as long as the controller determines "$S_O$=$S_O$" in response to the previous entry of an adjustment button activation signal $S_O$.

Therefore, a request outputted via depression of the gauge width adjustment button 75 following the leftward or rightward slanting of the running/rotation lever 7 is regarded as invalid, and an adjustment button activation signal $S_O$ entered in association is determined to be "0."

Further, because the running/rotation lever 7 can not be slanted forward or backward while it is slanted leftward or rightward on account of the physical restrictions imposed by the guide grooves 74, no running signal $S_D$ will not enter the controller 8 in this state. Furthermore, even if the rotational knob 72 is manipulated in this state, the controller determines a rotation signal $S_S$ fed thereby to be "0."

The present embodiment configured as above will ensure following advantages.

(1) According to the hydraulic shovel of this embodiment which comprises the running/rotation pedals 3L and 3R for running/rotating the vehicle, and the single running/rotation lever separately installed from the pedals for running/rotating the vehicle, it is possible for the operator to run a hydraulic shovel by operating on the running/rotation pedals 3L and 3R by feet, as well as by operating on the running/rotation lever 7 by hand. When operation on the running/rotation lever 7 is required, the operator can easily manipulate the lever by his one hand because the lever consists of a single lever, which will relieve the operator of the complicated operations and inconveniences encountered with the conventional hydraulic shovel, and improve the operability of the machine.

(2) Because the running/rotation lever 7 is installed close to one side of the operator's seat 2, the operator sitting on the seat can easily manipulate the running/rotation lever which will lead to a further improvement of the operability.

(3) Because the consoles 5 are provided on both sides of the seat 2 at a level sufficiently high to serve as arm rests, and the running/rotation lever 7 is installed in front of one of the consoles 5, the operator can manipulate the running/rotational lever 7 while resting his arm on the console 5, that is, he can run or rotate the vehicle while taking a relaxed posture.

(4) According to the hydraulic shovel of this embodiment, operation via activation of the running/rotation lever 7 is given priority over the counterpart introduced via activation of the running/rotation pedals 3L and 3R. Therefore, even if the running/rotation pedals 3L and 3R are concurrently manipulated with the running/rotation lever 7, and running signals $P_L$, $P_R$ and $S_D$, and a turn signal $S_S$ are simultaneously outputted to the controller 8, the risk of the controller's taking a wrong operation will be safely avoided.

(5) As long as the running/rotation lever 7 is not used, the running/rotation pedals 3L and 3R are available for operation. Therefore, when the operator does not hold the running/rotation lever 7, for example, being engaged in a work by manipulating the implement operation levers 6L and 6R, he can run or rotate the vehicle by operating on the running/rotation pedals 3L and 3R.

(6) If the operator operates on the running/rotation pedals 3L and 3R continuously over a long time, he will feel exerted because of his feet being confined to those pedals. To meet such a situation, the operator can swiftly switch to the operation via the running/rotation lever 7. Because operation via the running/rotation lever 7 is given priority, the operator will be safely relieved of the strain resulting from pedal operations, and feel less exerted than with the conventional machine.

(7) The top surface of the rotational knob 72 attached to the running/rotation lever 7 serves as a pressure sensitive surface 72B, and the running/rotation lever 7 outputs a grip detection signal $S_K$ to the controller 8 as long as it is held by the operator. Being fed the grip detection signal $S_K$, the controller 8 can quickly and securely determine for a given moment whether or not the running/rotation lever is held by the operator. Therefore, the controller can instantly determine for the given moment whether or not the running/rotation pedals 3L and 3R should be made available for operation.

(8) A grip detection signal $S_K$ is outputted as long as the running/rotation lever 7 is held by the operator, even if the lever is not involved in actual operation. Therefore, operation via activation of the running/rotation pedals 3L and 3R will be rejected as long as the running/rotation lever 7 is held by the operator. Accordingly, if the operator is changing the gauge width by manipulating the running/rotation lever 7, and by accident depresses the running/rotation pedal 3L or 3R, the vehicle will be safely prevented from running or rotating, which will ensure alteration of the gauge width to be securely achieved.

(9) The operator can run the vehicle forward or backward by slanting the lever body 71 of the running/rotation lever 7 forward or backward, and steer the vehicle by rotating the rotational knob 72. This means, the operator can run and steer the vehicle by simply resorting to the single running/rotation lever 7.

(10) Only slanting the lever body 71 (or the running/rotation lever 7) forward or backward is responsible for the running of the vehicle, and slanting the lever body leftward or rightward is not involved in operation of the vehicle. This allows lateral slanting of the lever to be available for altering the gauge width. Therefore, the operator can run/rotate the vehicle as well as alter the gauge width by simply operating on the running/rotation lever 7 alone.

(11) Because the slanting direction the running/rotation lever 7 can take is restricted with guide grooves 74, the risk of the lever being slanted leftward or rightward while the lever is slanted forward or backward, or conversely the risk of the lever being slanted forward or backward while it is slanted leftward or rightward will be strictly avoided. Accordingly, the risk of the gauge width being altered while the vehicle runs, or the risk of the vehicle being run while the gauge width is altered will be safely avoided via physical means.

(12) The controller 8 determines an adjustment button activation signal $S_O$ and a gauge width adjustment signal $S_G$ to be invalid, as long as it receives a running signal $S_D$ or a turn signal $S_S$. Therefore, the control means 8 strictly prohibits the gauge width from being simultaneously altered with running of the vehicle.

(13) To alter the gauge width, it is necessary for the operator to depress the gauge width adjustment button 75 and then slant the running/rotation lever 7 leftward or rightward. Thus, even if output of a gauge width adjustment signal $S_G$ occurs by simply slanting the running/rotation lever 7 leftward or rightward, that signal will be determined to be invalid. Wrong alteration of the gauge width will be prevented in this manner too.

Incidentally, this invention is not limited to the above embodiments, but may include various variants as long as they are introduced for the attainment of the object of this invention. For example, the following variants are included in this invention.

According to the above embodiment, as long as the running/rotation lever 7 is used, the controller 8 receives a grip detection signal SK, and determines running signals $P_L$ and $P_R$ fed in this state to be "0." In parallel with this control, there may be added another control; a switch is added to the output line from the running/rotation pedals 3; output of a grip detection signal $S_K$ activates a relay which beaks open the switch to interrupt the output line, thereby intercepting the output of the running signals $P_L$ and $P_R$.

The above embodiment is configured such that the operator can run the vehicle forward or backward by slanting the running/rotation lever 7 forward or backward, or steer the vehicle by rotating the rotational knob 72. However, the system may be configured such that the operator can steer the vehicle by slanting the running/rotation lever 7 leftward or rightward. In this case, the lever must be slanted in lateral directions while it is slanted in antero-posterior directions, and thus is incompatible with the use of the guide grooves 74 described earlier with respect to the above embodiment. Moreover, alteration of the gauge width must be achieved via an additional means such as a lever distinct from the one as described earlier with respect to the above embodiment.

In what manner the signals $S_K$, $P_L$, $P_R$, $S_D$, $S_S$, $S_O$, and $S_G$ outputted by the running/rotation lever 7 should be processed by the controller 8 may be determined arbitrarily as long as the processing of the signals is compatible with the object of this invention, and is not limited by the contents mentioned with respect to the above embodiments.

The grip detection sensor which serves as a signal output means in this invention is not limited to a pressure sensitive sensor as described above with respect to the above embodiments. It may include an arbitrarily chosen sensor such as a light-transmission or light-reflection optical sensor. The signal output means may include, in addition to sensors, a potentiometer which outputs a running signal $S_D$ in response to the manipulation of the running/rotation lever for running or rotation, or a signal output means which outputs a steering signal $S_S$ whose magnitude is proportional to the rotation angle of the rotational knob which is required for steering.

The specific shapes and operation modes of the running/rotation pedals 3, running/rotation lever 7 and implement operation levers 6 may be altered as appropriate to be adaptive for given applications.

What is claimed is:

1. A hydraulic shovel comprising:

a pair of left and right running/rotation pedals (3L and 3R) which, when simultaneously depressed forward or backward, output running signals ($P_L$ and $P_R$) responsible for running a vehicle forward or backward, and, when singly depressed forward or backward, outputs running signals ($P_L$ and $P_R$) responsible for turning the running vehicle leftward or rightward;

a single running/rotation lever (7) which, when slanted forward or backward, outputs a running signal ($S_D$) responsible for running the vehicle forward or backward, and, when rotated while the lever being slanted forward or backward, outputs a steering signal ($S_S$) responsible for turning the running vehicle leftward or rightward, and, when rotated while the lever being at a neutral position, outputs a rotation signal ($S_S$) responsible for rotating the vehicle standing on a spot; and a control means (8) which permits operation via either the running/rotation pedal (3L and 3R) or the running/rotation lever (7) for a given moment; wherein:

the control means (8) permits the running/rotation lever (7) to run or rotate the vehicle in preference to the running/rotation pedals (3).

2. A hydraulic shovel according to claim 1 wherein:

the running/rotation lever (7) is installed close to one side of an operator's seat (2).

3. A hydraulic shovel according to claim 2 wherein:

a console (5) is provided on one side of the seat (2), and the running/rotation lever (7) is provided on the console (5).

4. A hydraulic shovel according to claim 1 wherein: the running/rotation lever (7) is provided with a signal output means (20) for outputting a signal to the control means (8) when it is manipulated for running or rotating the vehicle; and the control means (8) permits the running/rotation pedals (3) to run or rotate the vehicle as long as the control means does not receive any signal from the signal output means (20).

5. A hydraulic shovel according to claim 4 wherein:

the signal output means (20) is a grip detection sensor (20) which monitors whether or not the running/rotation lever (7) is gripped, and outputs a signal whenever it detects the lever being gripped.

6. A hydraulic shovel according to claim 1 wherein:

the running/rotation lever (7) comprises a lever body (71) capable of being slanted, and a rotational knob (72) attached to the lever body (71);

slanting the lever body (71) forward or backward causes a running signal ($S_D$) to be outputted which is responsible for running the vehicle forward or backward;

rotating the rotational 1 knob (72) while the lever body (71) is slanted forward or backward causes a steering signal ($S_S$) to be outputted which is responsible for turning the running vehicle leftward or rightward, whereas rotating the rotational knob (72) while the lever body (71) is kept at a neutral position causes a steering signal ($S_S$) to be outputted which is responsible for rotating the vehicle standing on a spot.

7. A hydraulic shovel according to claim 6 wherein:

the lever body (71) of the running/rotation lever (7) outputs, when slanted leftward or rightward, a gauge width adjustment signal ($S_G$) which is responsible for altering a distance between left and right tracks of a running system.

8. A hydraulic shovel according to claim 7 wherein:

a guide groove (74) is provided to the running/rotation lever (71) so as to restrict the slanting direction of the lever.

9. A hydraulic shovel according to claim 7 wherein:

the running/rotation lever (7) is provided with a restriction means (75) to restrict the operation responsible for altering the inter-track distance.

10. A hydraulic shovel comprising:

running/rotation pedals (3) for running/rotating a vehicle;

a single running/rotation lever (7) installed separately from the running/rotation pedals (3) for similarly running/rotating the vehicle; and a control means (8) which permits operation via either the running/rotation pedals (3) or the running/rotation lever (7) at a given moment; wherein:

the control means (8) permits the running/rotation lever (7) to run or rotate the vehicle in preference to the running/rotation pedals (3).

11. A hydraulic shovel according to claim 10 wherein:

the running/rotation lever (7) is installed close to one side of an operator's seat (2).

12. A hydraulic shovel according to claim 11 wherein:

a console (5) is provided on one side of the seat (2), and the running/rotation lever (7) is provided on the console (5).

13. A hydraulic shovel according to claim 10 wherein:

the running/rotation lever (7) comprises a lever body (71) capable of being slanted, and a rotational knob (72) attached to the lever body (71);

slanting the lever body (71) forward or backward causes a running signal ($S_D$) to be outputted which is responsible for running the vehicle forward or backward;

rotating the rotational knob (72) while the lever body (71) is slanted forward or backward causes a steering signal ($S_S$) to be outputted which is responsible for turning the running vehicle leftward or rightward, whereas rotating the rotational knob (72) while the lever body (71) is kept at a neutral position causes a steering signal ($S_S$) to be outputted which is responsible for rotating the vehicle standing on a spot.

14. A hydraulic shovel according to claim 13 wherein:

the lever body (71) of the running/rotation lever (7) outputs, when slanted leftward or rightward, a gauge width adjustment signal ($S_G$) which is responsible for altering a distance between left and right tracks of a running system.

15. A hydraulic shovel according to claim 14 wherein:

a guide groove (74) is provided to the running/rotation lever (71) so as to restrict the slanting direction of the lever.

16. A hydraulic shovel according to claim 14 wherein:

the running/rotation lever (7) is provided with a restriction means (75) to restrict the operation responsible for altering the inter-track distance.

17. A hydraulic shovel according to claim 10 wherein:

the running/rotation lever (7) is provided with a signal output means (20) for outputting a signal to the control means (8) when it is manipulated for running or rotating the vehicle; and the control means (8) permits the running/rotation pedals (3) to run or rotate the vehicle as long as the control means does not receive any signal from the signal output means (20).

18. A hydraulic shovel according to claim 17 wherein:

the signal output means (20) is a grip detection sensor (20) which monitors whether or not the running/rotation lever (7) is gripped, and outputs a signal whenever it detects the lever being gripped.

* * * * *